United States Patent
Kojima et al.

(10) Patent No.: US 10,102,861 B2
(45) Date of Patent: *Oct. 16, 2018

(54) DEVICE CONTROL METHOD, DEVICE MANAGEMENT SYSTEM, AND VOICE INPUT APPARATUS

(71) Applicant: PANASONIC INTELLECTUAL PROPERTY CORPORATION OF AMERICA, Torrance, CA (US)

(72) Inventors: Yoshihiro Kojima, Hyogo (JP); Yoichi Ikeda, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,426

(22) Filed: Jul. 21, 2017

(65) Prior Publication Data
US 2017/0323646 A1 Nov. 9, 2017

Related U.S. Application Data

(63) Continuation of application No. 15/217,116, filed on Jul. 22, 2016, now Pat. No. 9,747,903, which is a (Continued)

(30) Foreign Application Priority Data

Apr. 8, 2014 (JP) .................................. 2014-079100

(51) Int. Cl.
*G10L 21/00* (2013.01)
*G10L 17/00* (2013.01)
(Continued)

(52) U.S. Cl.
CPC .............. *G10L 17/22* (2013.01); *G10L 15/08* (2013.01); *G10L 15/22* (2013.01); *G10L 25/72* (2013.01);
(Continued)

(58) Field of Classification Search
None
See application file for complete search history.

(56) References Cited

U.S. PATENT DOCUMENTS 7,139,716 B1 11/2006 Gaziz
7,933,776 B2 4/2011 Nagashima et al.
(Continued)

FOREIGN PATENT DOCUMENTS

JP 11-085191 3/1999
JP 2003-153355 5/2003
(Continued)

OTHER PUBLICATIONS

Extended European Search Report, dated Jul. 29, 2015 by the European Patent Office, for the related European Patent Application No. 15160749.6.

*Primary Examiner* — Satwant Singh
(74) *Attorney, Agent, or Firm* — Greenblum & Bernstein, P.L.C.

(57) ABSTRACT

Methods, systems, and media for managing a plurality of target devices are provided. A voice command is received by an input associated with a first target device. The voice command includes first voice information and indicates an operation instruction. The first voice information includes identification information. The first target device is specified by referencing a database in which the identification information and a device ID of the first target device are associated. It is determined whether the voice command includes second voice information that identifies a second
(Continued)

target device as an operation object for the operation instruction. When the second voice information is not included, the first target device is caused to execute the operation instruction. When the second voice information is included, a control command is transmitted to the second target device for causing the second target device to execute the operation instruction.

10 Claims, 9 Drawing Sheets

Related U.S. Application Data continuation of application No. 14/667,661, filed on Mar. 24, 2015, now Pat. No. 9,431,017.

(51) Int. Cl.
| | | |
|---|---|---|
| *G10L 17/22* | (2013.01) | |
| *G10L 25/72* | (2013.01) | |
| *G10L 15/08* | (2006.01) | |
| *G10L 15/22* | (2006.01) | |
| *G10L 15/30* | (2013.01) | |

(52) U.S. Cl.
CPC ........ *G10L 15/30* (2013.01); *G10L 2015/223* (2013.01)

(56) References Cited

U.S. PATENT DOCUMENTS

| | | | |
|---|---|---|---|
| 8,340,975 | B1 | 12/2012 | Rosenberger |
| 8,825,020 | B2 * | 9/2014 | Mozer ................... H04L 12/282 |
| | | | 379/102.01 |
| 9,431,017 | B2 * | 8/2016 | Kojima .................... G10L 15/22 |
| 9,747,903 | B2 * | 8/2017 | Kojima .................... G10L 15/22 |
| 2013/0183944 | A1 | 7/2013 | Mozer et al. |
| 2014/0330435 | A1 | 11/2014 | Stoner et al. |
| 2015/0066516 | A1 | 3/2015 | Nishikawa et al. |
| 2015/0235642 | A1 | 8/2015 | Nishikawa et al. |

FOREIGN PATENT DOCUMENTS

| | | |
|---|---|---|
| JP | 2005-303936 | 10/2005 |
| JP | 2007-121576 | 5/2007 |
| WO | 2008/130095 | 10/2008 |

\* cited by examiner

FIG. 2

| DEVICE NAME | OPERATION NAME | OPERATION CONTENT | CONTROL INFORMATION |
|---|---|---|---|
| TELEVISION | INCREASE VOLUME | INCREASE VOLUME BY THREE LEVELS | (volume, +3) |
| | VOLUME UP | | |
| | CHANGE TO CHANNEL 2 | SELECT CHANNEL 2 | (channel, 2) |
| | ... | ... | ... |
| VIDEO RECORDER | CHANGE TO CHANNEL 2 | SELECT CHANNEL 2 | (channel, 2) |
| | RECORD | RECORD PROGRAM CURRENTLY BEING BROADCAST | (record, start) |
| | PLAY | PLAY PROGRAM CURRENTLY SELECTED | (play, start) |
| | ... | ... | ... |
| AIR CONDITIONER | TURN ON COOLING | TURN AIR CONDITIONER ON, PERFORM COOLING OPERATION | (cooling, on) |
| | LOWER TEMPERATURE | LOWER AIR CONDITIONER TEMPERATURE BY ONE DEGREE | (temperature, −1) |
| | ... | ... | ... |
| ... | | | |

FIG. 5A

| DEVICE NAME | DEVICE IDENTIFIER |
|---|---|
| TELEVISION | TELEVISION 001 |
| MICHAEL | |
| . . . | |
| AIR CONDITIONER | AIR CONDITIONER 001 |
| CATHY | |
| . . . | |
| . . . | . . . |

FIG. 5B

| REMOTE CONTROL IDENTIFICATION INFORMATION | DEVICE IDENTIFIER |
|---|---|
| R001 | TELEVISION 001 |
| R002 | VIDEO RECORDER 001 |
| R003 | AIR CONDITIONER 001 |
| . . . | . . . |

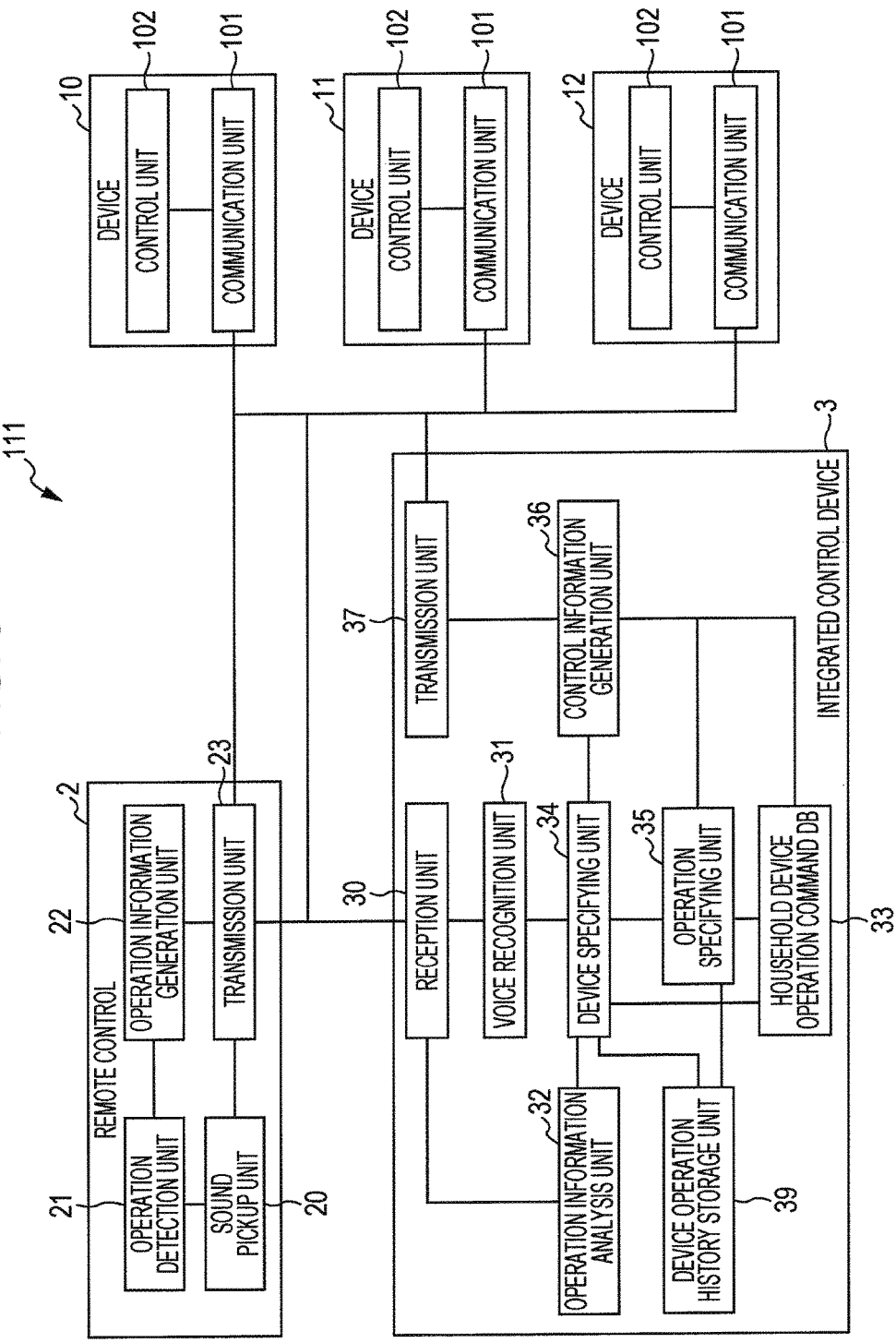

DEVICE CONTROL METHOD, DEVICE MANAGEMENT SYSTEM, AND VOICE INPUT APPARATUS

CROSS REFERENCE TO RELATED APPLICATIONS

This application is a continuation of U.S. application Ser. No. 15/217,116, filed on Jul. 22, 2016, which is a continuation of U.S. application Ser. No. 14/667,661, filed on Mar. 24, 2015 and now U.S. Pat. No. 9,431,017, which claims priority to Japanese Application No. 2014-079100, filed on Apr. 8, 2014. The disclosures of these documents, including the specifications, drawings, and claims, are incorporated herein by reference in their entirety.

BACKGROUND

1. Technical Field

The present disclosure relates to a device control method, a device management system, and a voice input apparatus for using voice recognition to remotely operate a plurality of electronic devices.

2. Description of the Related Art

In recent years, voice recognition accuracy has greatly improved due to the development of voice recognition technology. Together with this, device management systems that operate various devices by voice are being studied. Thus, it is expected that it will become possible for various devices to be controlled by a user speaking desired operation content to the various devices without performing troublesome button operations.

Japanese Unexamined Patent Application Publication No. 11-85191 and No. 2003-153355 disclose a system in which a plurality of devices are controlled in an integrated manner by a user speaking a voice command.

SUMMARY

However, the aforementioned system is still at the investigation stage even at the present moment in time, and further improvements are required for the practical application thereof.

One non-limiting and exemplary embodiment provides a device control technology that can withstand practical application and is easy for a user to use.

In one general aspect, the techniques disclosed here feature a method in a device management system for managing a plurality of target devices that comprises: receiving, from a voice input apparatus associated with a first target device among the plurality of target devices, instruction information that includes first voice information indicating an operation instruction for any target device among the plurality of target devices; recognizing the operation instruction from the first voice information; determining whether or not second voice information indicating a second target device among the plurality of target devices is included in the instruction information; and transmitting, (i) if the second voice information is not included in the instruction information, a control command for executing the recognized operation instruction to the first target device, or, (ii) if the second voice information is included in the instruction information, the first control command to the second target device.

It should be noted that general or specific embodiments may be implemented as a system, a method, an integrated circuit, a computer program, a storage medium, or any selective combination thereof.

According to the aforementioned aspect, further improvement can be realized.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a drawing depicting an example of information stored in a household device operation command database according to exemplary embodiment 1;

FIG. 5A is a drawing depicting an exemplary device name management table;

FIG. 5B is a drawing depicting an exemplary remote control corresponding device management table;

FIG. 6 is a block diagram of a voice operation system for a plurality of devices according to exemplary embodiment 2;

DETAILED DESCRIPTION

Figure 1:
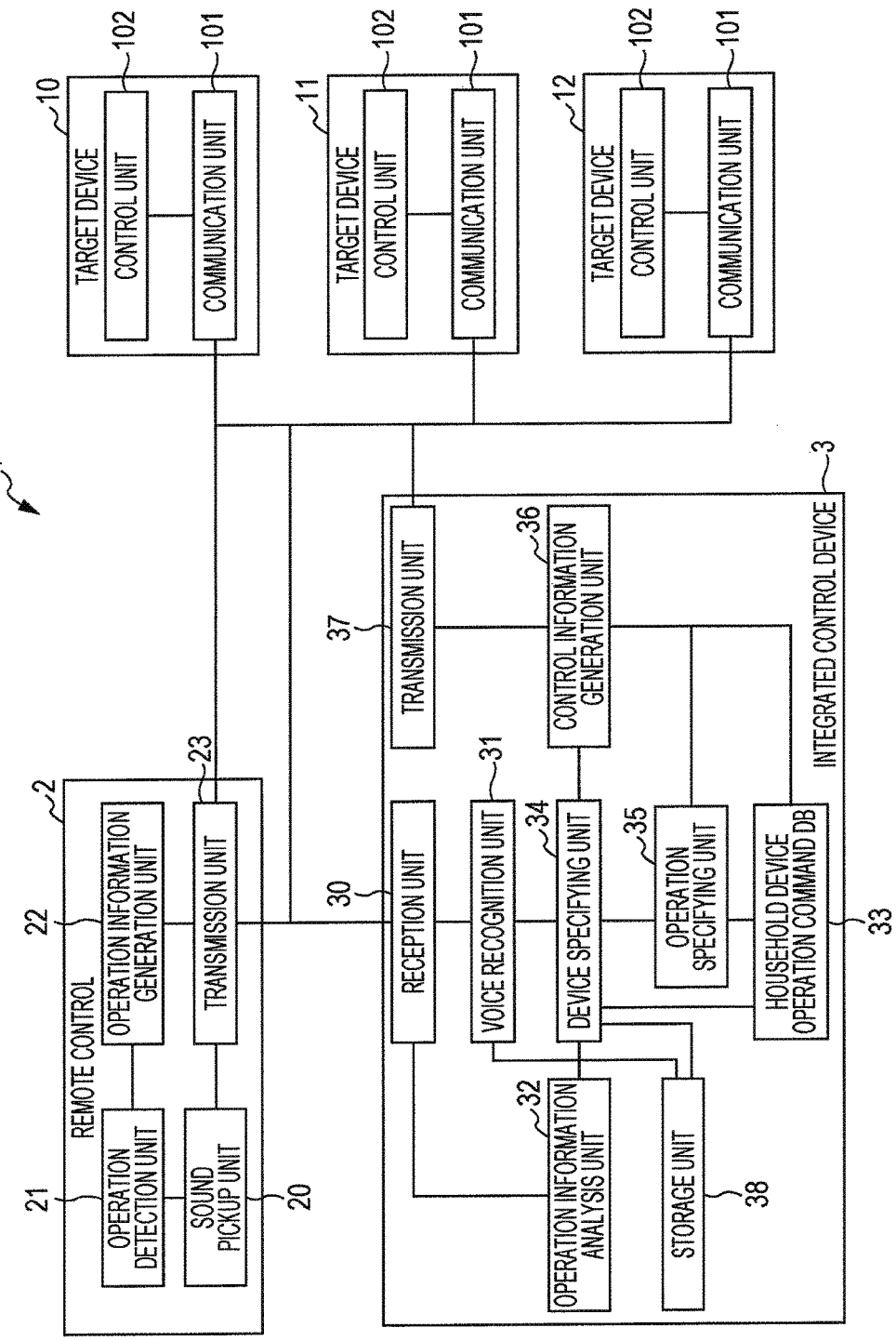
FIG. 1 is a block diagram of a voice operation system for a plurality of devices according to exemplary embodiment 1.

Underlying Knowledge Forming Basis of the Present Disclosure

In conventional electronic devices, it is often the case that remote controls which are specifically for each device are provided and, ordinarily, a user uses these dedicated remote controls to remotely operate the corresponding electronic devices. However, together with the increase in the functions of electronic devices in recent years, the number of buttons on remote controls has radically increased, and a problem has arisen in that the user is not able to easily carry out an intended operation. Therefore, recently, various kinds of remote controls and electronic devices that are provided with voice recognition functions have been proposed in order to improve the ease of use of remote controls while also reducing the number of buttons on remote controls.

Meanwhile, together with progress in home networks such as wireless LANs and ECHONET, recently, as well as AV devices such as televisions and information devices such as personal computers, white goods such as air conditioners and refrigerators have also come to be ordinarily connected to a home network. There have consequently been a large number of proposals for systems that control all electrical devices inside a home in an integrated manner via these home networks. In addition, in order to improve the ease of use of this kind of integrated control system, integrated control systems in which a voice recognition function is used have been proposed, and it has become possible for various electronic devices in a household to be operated by voice.

For example, Japanese Unexamined Patent Application Publication No. 11-85191 and No. 2003-153355 disclose a system in which a plurality of devices are controlled in an integrated manner by a user speaking a voice command. Specifically, the user is able to voice-operate an operation-target device by successively speaking an operation-target device name (for example, "television" or "air conditioner") and an operation name that indicates the content of an operation for each device (for example, "increase volume" or "cooling").

As in Japanese Unexamined Patent Application Publication No. 11-85191, in a conventional system in which a plurality of devices are operated in an integrated manner by voice, in order to specify an operation-target device, a user ordinarily has to speak a voice command that includes the operation-target device name (for example, "television" or "air conditioner"), for example, "television, increase volume" or "air conditioner, turn on heating".

Thus, there is a problem in that, even when the device for which the user is to perform a voice operation is, for the most part, one device from among a plurality of devices on a home network, the user usually has to speak a voice command that includes that device name, and the operation is troublesome.

Furthermore, in the situation where a user who has already been using an individual electronic device provided with a voice recognition function has, in order to operate a plurality of electronic devices, introduced an integrated control system in which a home network is used, it becomes possible for the user to operate all of the devices on the home network by voice; however, when voice-operating the electronic device provided with the existing voice recognition function, it has usually been necessary for the user to speak a voice command that includes that device name.

For example, a user who has been in possession of a TV provided with an existing voice recognition function has been able to operate the TV merely by speaking an operation name such as "channel 4" or "increase volume" when using only the TV; however, after having introduced the integrated control system, the user usually has to speak a word such as "television" that indicates a device name, as in "television, channel 4" and "television, increase volume".

Thus, immediately after introducing the integrated control system, when the user voice-operates the electronic device provided with the existing voice recognition function, the possibility of the user performing erroneous speech such as forgetting to add a device name becomes extremely high. Thus, until the user becomes used to speaking voice commands that include a device name, with regard to the electronic device provided with the existing voice recognition function, there is a problem in that erroneous operations frequently occur and the operation is felt to be troublesome compared to when voice operations were carried out with only the device. In particular, when the electronic device provided with the existing voice recognition function is an electronic device with which the user frequently carries out voice operations, there is a possibility of there being a notable decline in operability, and there is a problem in that the user is not able to smoothly switch over to the integrated control system.

Therefore, the purpose of the present disclosure is to provide a voice operation system for a plurality of devices that has excellent operability, in which it is possible for a plurality of electronic devices to be voice-operated, and a voice operation is possible with regard to a specific device for which a user frequently carries out a voice operation, even when that device name is omitted.

Therefore, the inventor of the present application investigated the following improvement measure, for the functional improvement of a device management system in which voice input is used.

In a device control method in a device management system that is connected to a plurality of target devices arranged in the same household and manages the plurality of target devices, instruction information that includes first voice information indicating an operation instruction for one or more target devices among the plurality of target devices is received from a voice input apparatus associated with a specific target device among the plurality of target devices, via a network, the operation instruction is recognized from the first voice information included in the received instruction information, and a determination is made as to whether or not second voice information indicating any target device among the plurality of target devices is included in the instruction information, and, if the second voice information is not included in the instruction information, a control command that causes the recognized operation content to be executed is transmitted to the specific target device corresponding to the voice input apparatus, via the network, or, if the second voice information is included in the instruction information, the control command is transmitted to a target device indicated by the second voice information, via the network.

According to the aforementioned aspect, if the second voice information indicating any target device among the plurality of target devices is not included in the instruction information received from the voice apparatus, a control command that causes the recognized operation content to be executed is transmitted to the specific target device corresponding to the voice input apparatus, or, if the second voice information is included in the instruction information, the control command is transmitted to a target device indicated by the second voice information.

Thus, for example, a voice operation for which a voice input apparatus is used can be carried out for a plurality of target devices on a home network, and, for example, a voice operation in which the speaking of the device name has been omitted becomes possible with regard to a specific target device among the plurality of target devices that is associated with one voice input apparatus.

Accordingly, for example, when the usage frequency of a voice operation for a specific target device is high compared to other target devices, or when it is determined that, for the most part, one target device is being used, it is no longer necessary to speak the device name or the like for the specific device, and therefore the complexity for the user can be reduced, and also quick operation instructions for the specific target device become possible. In addition, for example, even when a user who has been using a voice recognition device by means of an existing voice input apparatus has introduced an integrated control system in which a home network is used, a voice command in which the device name or the like has been omitted may be received when the user uses the voice input apparatus associated with the existing voice recognition device to operate the target device, and therefore it is made possible for the same operation as that prior to the introduction of the system to be carried out, and it becomes possible to reduce erroneous operations.

In the aforementioned aspect, for example, the instruction information may include identification information that identifies the voice input apparatus, reference may be made to a first database in which the identification information and the device ID of the specific target device are associated, to specify the specific target device, and the control command may be transmitted to the specific target device.

In the aforementioned aspect, for example, reference may be made to a second database in which device IDs corresponding to each of the plurality of target devices and the second voice information are associated, to specify the target device indicated by the second voice information, and the control command may be transmitted to the target device indicated by the second voice information.

In the aforementioned aspect, for example, the voice input apparatus may be provided with a physical button or a touch panel, and the operation instruction for the one target device, which is input using the physical button or the touch panel, may be transmitted using wireless communication.

Furthermore, in another aspect, in a device control method in a device management system that is connected to a plurality of target devices arranged in the same household and manages the plurality of target devices, if a user is using a remote controller associated with a specific target device among the plurality of target devices, remote control identification information that identifies the remote controller from remote controllers is received via a network, instruction information that includes first voice information indicating an operation instruction for one or more target devices among the plurality of target devices is received from a voice input apparatus connected to the device management system, via the network, the operation instruction is recognized from the first voice information included in the received instruction information, and a determination is made as to whether or not second voice information indicating any target device among the plurality of target devices is included in the instruction information, and, if the second voice information is not included in the instruction information, the specific target device corresponding to the remote controller is specified based on the received remote control identification information, and a control command that causes the recognized operation content to be executed is transmitted to the specific target device via the network, or, if the second voice information is included in the instruction information, the control command is transmitted to a target device indicated by the second voice information, via the network.

According to the aforementioned aspect, if the second voice information indicating any target device among the plurality of target devices is not included in the instruction information received from the voice apparatus, the specific target device corresponding to the remote controller is specified based on the received remote control identification information, and a control command that causes the recognized operation content to be executed is transmitted to the specific target device, or, if the second voice information is included in the instruction information, the control command is transmitted to a target device indicated by the second voice information.

Thus, for example, if the device name has not been extracted from the input voice of a user, the device that is the operation target of the user can be specified using remote control operation information that is output from a remote controller. In addition, in the present configuration, the voice input apparatus that inputs the voice of the user and the remote controller are separate configurations, and remote control operation information is generated based on a user operation with respect to the remote controller. Accordingly, the device that is the operation target of the user can be specified by the user, for example, merely holding the remote controller, even when the user does not intend to operate the remote controller, and, in addition, it becomes possible for complexity for the user to be reduced.

Furthermore, for example, a voice operation for which a voice input apparatus is used can be carried out for a plurality of target devices on a home network, and, for example, a voice operation in which the speaking of the device name has been omitted becomes possible with regard to a specific target device among the plurality of target devices that is associated with one remote controller.

In the aforementioned other aspect, for example, reference may be made to a first database in which the remote control identification information and a device ID of the specific target device are associated, to specify the specific target device, and the control command may be transmitted to the specific target device.

In the aforementioned other aspect, for example, reference may be made to a second database in which device IDs corresponding to each of the plurality of target devices and the second voice information are associated, to specify the target device indicated by the second voice information, and the control command may be transmitted to the target device indicated by the second voice information.

Furthermore, in another aspect, in a device management system that is connected to a plurality of target devices arranged in the same household and manages the plurality of target devices, a management apparatus that manages the device management system receives instruction information that includes first voice information indicating an operation instruction for one or more target devices among the plurality of target devices, from a voice input apparatus associated with a specific target device among the plurality of target devices, via a network, recognizes the operation instruction from the first voice information included in the received instruction information, and determines whether or not second voice information indicating any target device among the plurality of target devices is included in the instruction information, and, if the second voice information is not included in the instruction information, transmits a control command that causes the recognized operation content to be executed, to the specific target device corresponding to the voice input apparatus, via the network, or, if the second voice information is included in the instruction information, transmits the control command to a target device indicated by the second voice information, via the network, and the voice input apparatus transmits the instruction information that includes the first voice information indicating the operation instruction for the one or more target devices among the plurality of target devices.

It should be noted that these comprehensive or specific aspects may be realized by a system, a method, an integrated circuit, a computer program, or a recording medium such as a computer-readable CD-ROM, and may be realized by an arbitrary combination of a system, a method, an integrated circuit, a computer program, and a recording medium.

Hereinafter, exemplary embodiments of the present disclosure are described with reference to the appended drawings.

It should be noted that the embodiments described hereinafter all represent comprehensive or specific examples. The numerical values, the shapes, the materials, the constituent elements, the arrangement positions and modes of connection of the constituent elements, the steps, and the order of the steps and the like given in the following embodiments are examples and are not intended to limit the present disclosure. Furthermore, constituent elements that are not described in the independent claims representing the most significant concepts from among the constituent elements in the following embodiments are described as optional constituent elements.

Hereinafter, a voice operation system that uses voice to operate a plurality of devices arranged in the same household is described as an example of a device management system that is connected to a plurality of target devices and manages the plurality of target devices.

Embodiment 1

FIG. 1 is a block diagram of a voice operation system 1 for a plurality of devices according to the present embodiment.

As depicted in FIG. 1, the voice operation system 1 for a plurality of devices includes a device 10, a device 11, and a device 12 that are operation targets, a remote control 2, and an integrated control device 3 that controls the operation of the devices 10 to 12. It should be noted that although a description is given here with there being three operation-target devices included in the voice operation system 1, the number of the operation-target devices included the voice operation system 1 may be less than or more than this. Here, it is assumed that the remote control 2 is a remote control that is associated with the device 10. Generally, it is assumed that the remote control 2 is a device 10—dedicated remote control that is included when the device 10 is purchased by itself, and identification information indicating that the remote control 2 is associated with the device 10 is assigned to the remote control 2.

As depicted in FIG. 1, the remote control 2 includes a sound pickup unit 20, an operation detection unit 21, an operation information generation unit 22, and a transmission unit 23. A plurality of operation buttons for executing each function of the device 10 are arranged on the upper surface of the remote control 2. For example, when the device 10 is a television, a volume control button, a channel selection button, and a menu button and the like are arranged as operation buttons on the remote control 2. Here, these buttons may be arranged on the remote control 2 as physical buttons, or may be implemented as a touch panel.

Furthermore, in order to input the voice of the user, the sound pickup unit 20, which is a microphone, and a voice input start button (not depicted in FIG. 1) for notifying the sound pickup unit 20 of the start of voice input by the user are arranged, besides the usual operation buttons, on the upper surface of the remote control 2.

The operation detection unit 21 detects user operations with respect to each operation button of the remote control 2, and outputs a signal corresponding to each operation button. For example, if a voice input start button press operation by the user is detected, a voice input start signal is output. The operation information generation unit 22 generates remote control operation information on the basis of the identification information of the remote control 2 and a signal received from the operation detection unit 21. The transmission unit 23 transmits the voice obtained from the sound pickup unit 20, and the remote control operation information obtained from the operation information generation unit 22, to the devices 10 to 12 and the integrated control device 3 by means of a communication method such as infrared, Bluetooth (registered trademark), or a wireless LAN or the like. At such time, with regard to the voice transmitted to the integrated control device, voice data obtained from the sound pickup unit 20 may be transmitted as it is, or a feature quantity may be extracted from the obtained voice data and the extracted feature quantity may be transmitted.

The integrated control device 3 includes a reception unit 30, a voice recognition unit 31, an operation information analysis unit 32, a household device operation command database (hereinafter referred to as a household device operation command DB) 33, a device specifying unit 34, an operation specifying unit 35, a control information generation unit 36, a transmission unit 37, and a storage unit 38.

The reception unit 30 receives voice data and remote control operation information transmitted from the remote control 2. At such time, if the voice data is intended for a device operation by the user, the voice data and the remote control operation information are received as instruction information. The voice recognition unit 31 recognizes the content indicated by the voice data, based on the voice data obtained from the reception unit 30. If the content indicated by the voice data includes, for example, an operation instruction for any of the devices, information specifying the device (device name) and information specifying the content of the operation instruction (operation name) are output as a recognition result. The operation information analysis unit 32 extracts the identification information of the remote control 2 from the remote control operation information obtained from the reception unit 30.

A device name, an operation name, operation content corresponding to the operation name, and control information corresponding to the operation content and the like are stored for each device connected to the home network, in the household device operation command DB 33.

FIG. 2 depicts an example of the information stored in the household device operation command DB 33 when the device 10 is a television, the device 11 is a video recorder, and the device 12 is an air conditioner. As depicted in FIG. 2, the device names are words with which the user designates an operation-target device. In FIG. 2, these are "television", "video recorder", and "air conditioner". Furthermore, the operation names are words with which the user instructs an operation to a device, and when the device is a television, the operation names are "increase volume" and "change to channel 2" and the like. Furthermore, the operation content is the content of an operation that is actually carried out by a device in accordance with an operation name. For example, in the case of a television, the operation content of "increase television volume by three levels" is associated with the operation name of "increase volume". It should be noted that a plurality of operation names that correspond to item of each operation content may be registered. For example, in FIG. 2, the two expressions of "increase volume" and "volume up" are registered for the operation content of "increase television volume by three levels". Furthermore, the control information is constituted by network commands for causing an operation-target device to execute operation content, and is transmitted to the operation-target device via the home network. For example, in the example of FIG. 2, when the television is caused to execute the operation content of "increase television volume by three levels", the network command of (volume, +3) is transmitted to the television.

The device specifying unit 34 uses the device names stored in the household device operation command DB 33, a device name obtained from the voice recognition unit 31, and identification information of the remote control 2 obtained from the operation information analysis unit 32, to specify the operation-target device of the user.

Based on the device name specified by the device specifying unit 34 and the operation name obtained from the voice recognition unit 31, the operation specifying unit 35 searches the operation names of each device stored in the household device operation command DB 33, and specifies the operation content for the operation-target device.

Based on the device name specified by the device specifying unit 34 and the operation content specified by the operation specifying unit 35, the control information generation unit 36 searches the control information of each device stored in the household device operation command DB 33, and obtains control information for remotely controlling the operation-target device, via the home network.

The transmission unit 37 transmits the control information obtained by the control information generation unit 36, to the device specified by the device specifying unit 34, via the home network.

The device 10, the device 11, and the device 12 are operation-target devices connected on the home network.

The devices 10 to 12 each include a communication unit 101 and a control unit 102. The communication unit 101 receives a control signal from the integrated control device 3, via the home network. Furthermore, it is also possible for control information to be received from the remote control 2, via wireless communication such as infrared communication.

The control unit 102 executes a corresponding operation, based on the control information received by the communication unit 101, in the devices 10 to 12.

Hereinafter, an operation that is carried out when the user voice-operates the devices 10 to 12 is described with regard to the voice operation system 1 for a plurality of devices configured as described hereinabove, in the present embodiment.

In the present embodiment, when the user voice-operates the devices 10 to 12, first, the user holds the remote control 2 and pushes the voice input start button on the remote control 2, and then speaks a voice command towards the microphone on the remote control 2. For example, when the device 10 is a television, the device 11 is a video recorder, and the device 12 is an air conditioner, the user says "television, increase volume" when wanting to operate the volume of the television, and says "air conditioner, lower temperature" when wanting to lower the temperature of the air conditioner, and the like.

Figure 3:
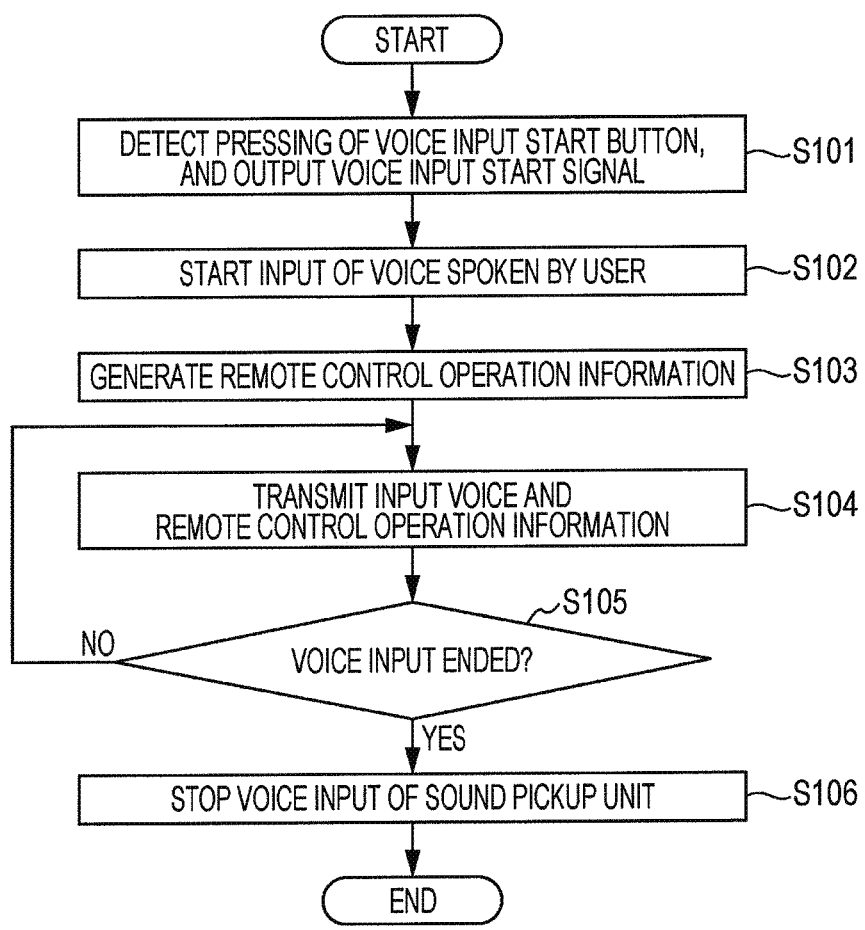
FIG. 3 is a flowchart illustrating the operation of a remote control according to exemplary embodiment 1.

FIG. 3 depicts a procedure for the processing of the remote control 2 when the user performs voice input to the remote control 2. Hereinafter, the operation of the remote control 2 is described using FIG. 3.

When the voice input start button on the remote control 2 is pressed by the user, the operation detection unit 21 detects the press operation of the voice input start button and outputs a voice input start signal to the sound pickup unit 20 and the operation information generation unit 22 (S101). When the voice input start signal is received from the operation detection unit 21, the sound pickup unit 20 starts inputting the voice spoken by the user (S102). Furthermore, when the voice input start signal is received from the operation detection unit 21, the operation information generation unit 22 generates information in which voice input start information and identification information indicating the remote control 2 are combined, as remote control operation information (S103). The transmission unit 23 transmits the voice obtained from the sound pickup unit 20, and the remote control operation information obtained from the operation information generation unit 22, to the integrated control device 3 and the devices 10 to 12 (S104). The sound pickup unit 20 ordinarily checks whether or not the voice input from the user is continuing (S105), and stops the voice input and also stops voice output to the transmission unit 23 if it is determined that the voice input from the user has ended (S106). It should be noted that the determination as to whether the voice input has ended is carried out using a method or the like in which it is determined that the voice input of the user has finished if the level of the input voice has become equal to or less than a fixed value, for example. Furthermore, after the sound pickup unit 20 has stopped the voice input, the user may press the voice input start button once again if the user wishes to carry out voice input once again. In the remote control 2, when voice input start is pressed once again, the processing from S1 is executed once again, and the voice of the user is input and transmitted together with remote control operation information from the transmission unit 23.

The aforementioned is the operation carried out by the remote control 2 when the user has input a voice command to the remote control 2.

Figure 4:
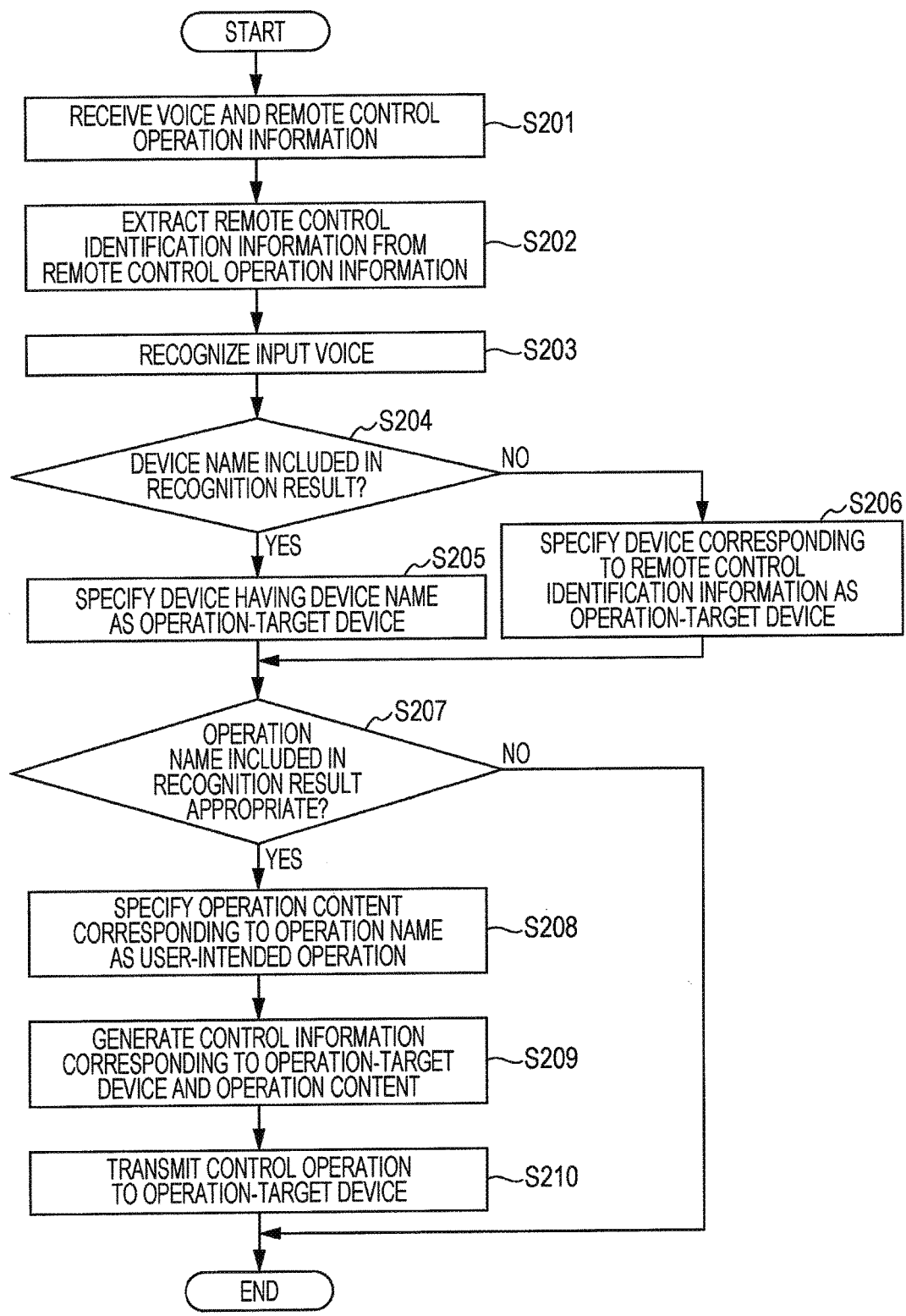
FIG. 4 is a flowchart illustrating the operation of an integrated control device according to exemplary embodiment 1.

FIG. 4 depicts a procedure for the processing of the integrated control device 3. Hereinafter, the operation of the integrated control device 3 is described using FIG. 4.

First, the reception unit 30 receives voice and remote control operation information transmitted from the transmission unit 23 of the remote control 2 (S201).

Next, the operation information analysis unit 32 extracts the identification information of the remote control 2 from the remote control operation information received by the reception unit 30 (S202).

Furthermore, the voice recognition unit 31 recognizes the voice received by the reception unit 30, and obtains a device name or an operation name as a recognition result (S203). For example, when the user has spoken "air conditioner, turn on cooling" as a voice command, the voice recognition unit 31 outputs the device name "air conditioner" or the operation name "turn on cooling" as a recognition result if correctly recognized. Furthermore, if the user has omitted the device name and spoken "increase volume", the operation name "increase volume" is output, without a device name, as a recognition result.

It should be noted that, in the voice recognition unit 31, a conventional DP matching method, a hidden Markov model (HMM) method, or an N-Gram method is used as the method for recognizing voice. A recognition dictionary for carrying out voice recognition is stored in the storage unit 38. In the recognition dictionary, information for recognizing "(device name)(operation name)" and "(operation name)" voice commands are included for each item of operation content of the devices 10 to 12. For example, when the device 10 is a television, information for recognizing voice commands such as "television, change to channel 2" and "change to channel 2" is stored in the recognition dictionary, corresponding to operation content such as selecting channel 2. It should be noted that not only information regarding operations of the devices 10 to 12 currently connected to the home network but also information for voice-operating general household electrical appliances may be stored in the recognition dictionary.

The device specifying unit 34 refers to device names stored in the household device operation command DB 33, and, first, confirms whether or not a device name is included in the recognition result that has been output from the voice recognition unit 31 (S204). If a device name stored in the household device operation command DB 33 is included in the recognition result (if "Y" in S204), the device having that device name is specified as the device that is the operation target of the user (S205). At such time, for example, a device name management table such as that depicted in FIG. 5A is used to specify the device that is the operation target of the user. In the device name management table, device names and identifiers of the corresponding devices are associated and managed. If a word that is registered as a device name in the device name management table is included in the voice recognized in the voice recognition unit 31, the device corresponding to that word is specified. The names of general devices such as television and air conditioner may be managed as device names; for example, a configuration is permissible in which the user can associate an arbitrary name with a device to perform management, such as associating the name "Michael" with a television having a "television 001" identifier, and associating the name "Cathy" with an air conditioner having an "air conditioner 001" identifier. Furthermore, a plurality of names may be associated with each corresponding device.

Conversely, if a device name is not included in the recognition result (if "N" in S204), based on the identification information of the remote control 2 extracted by the processing of S202, the device 10 corresponding to that identification information is specified as the device that is the operation target of the user (S206). At such time, for example, a remote control corresponding device management table such as that depicted in FIG. 5B is used to specify the device that is the operation target of the user. The remote control corresponding device management table manages the identifiers of devices associated with the remote control 2. The voice operation system 1 according to an aspect of the present disclosure may be a configuration that includes a plurality of the remote controls 2, and there may be a remote control 2 that corresponds to each device as depicted in FIG. 5B. It should be noted that the device name management table and the remote control corresponding device management table of FIG. 5A and FIG. 5B may be stored in the storage unit 38, in the integrated control device 3.

Hereinafter, the operation of the device specifying unit 34 is described using a specific example. For example, it is assumed that the device 10 is a television and the household device operation command DB 33 is that depicted in FIG. 2. Here, the household device operation command DB 33 may manage the identifiers of devices corresponding to each device name. When the user has spoken "television, change to channel 2" to the television-dedicated remote control 2 for inputting voice, the device name "television" is obtained as a voice recognition result (S203). Next, it is confirmed whether or not the recognized device name "television" is included in the household device operation command DB 33 (S204). Since the recognized device name "television" is included in the device names stored in the household device operation command DB 33 depicted in FIG. 2, in this case, the device that is the operation target of the user is specified as being the television (S205). Here, for example, reference may be made to a device name management table in which device names and identifiers of devices are associated, such as that of FIG. 5A, to specify the device indicated by the device name obtained as the voice recognition result.

Similarly, when the user has spoken "change to channel 2" with the device name being omitted, a voice recognition result is obtained without a device name (S203). Since a device name is not included in the recognition result (S204), next, the device corresponding to the identification information of the remote control 2 is obtained. Since the device corresponding to the identification information of the remote control 2 is the television, in this case also, the device that is the operation target of the user is specified as being the television (S206). Here, for example, reference is made to a remote control corresponding device management table in which the identification information of the remote control 2 and the identifiers of devices are associated, such as that depicted in FIG. 5B, to specify that the device corresponding to the identification information of the remote control 2 is the television.

The operation specifying unit 35 confirms the appropriateness of the operation name obtained by the recognition processing (S203) of the voice recognition unit 31 (S207), and if determined as being appropriate, the operation content corresponding to that operation name is specified as the intended operation of the user with respect to the operation-target device (S208).

The processing of the operation specifying unit 35 is carried out with the following procedure.

First, the device name specified by the processing of S205 or the processing of S206 is used to search the household device operation command DB 33 and read out all operation names corresponding to the specified device. Next, it is confirmed whether or not the operation name obtained by the recognition processing (S203) of the voice recognition unit 31 matches any of the operation names read out from the household device operation command DB 33, and if there is a match, it is determined that the operation name is appropriate (S207). If it is determined that the operation name is appropriate (if "Y" in S207), the operation content corresponding to that operation name is read out from the household device operation command DB 33, and that operation content is specified as the intended operation of the user with respect to the operation-target device (S208).

Conversely, if there is no match, there is no operation corresponding to the specified device, and it is therefore determined that the operation name obtained from the recognition result is not appropriate ("N" processing in S207), and the series of processing corresponding to the voice command spoken by the user is ended.

For example, when it is assumed that the device 10 is a television and the household device operation command DB 33 is that depicted in FIG. 2, if the user has spoken "television, change to channel 2", the operation name "change to channel 2" is obtained as the recognition result (S203). Next, the household device operation command DB 33 is used to confirm whether or not the operation name "change to channel 2" is registered for the device "television" that has already been specified (S207). Since the recognized operation name "change to channel 2" is included in the operation names stored in the household device operation command DB 33 depicted in FIG. 2, in this case, the content of the intended operation of the user is specified as "select channel 2" (S208).

Based on the device specified by the processing of S205 or the processing of S206 and the operation content specified by the processing of S208, the control information generation unit 36 searches control information of each device stored in the household device operation command DB 33, and obtains control information for remotely controlling the operation-target device (S209).

For example, when it is assumed that the device 10 is a television and the household device operation command DB 33 is that depicted in FIG. 2, if the voice command "television, change to channel 2" of the user is correctly recognized and the device is specified as "television" and the operation content is specified as "select channel 2", "(channel, 2)" is obtained as the control information on the basis of the household device operation command DB 33.

The transmission unit 37 transmits the control information obtained by the processing of S209, to the device specified by the processing of S205 or the processing of S206, via the home network (S210).

The aforementioned is the operation carried out by the integrated control device 3 when voice and remote control operation information transmitted from the remote control 2 has been input.

Lastly, the operation of the devices 10 to 12 is described. It should be noted that the devices 10 to 12 each carry out the same operation, and therefore, hereinafter, the device 10 is described as an example.

In the device 10, first, the communication unit 101 receives control information from the remote control 2 and the integrated control device 3, via the home network. A corresponding operation is then executed based on the control information received by the control unit 102.

For example, if it is assumed that the device 10 is a television, when the user has spoken the voice command "television, change to channel 2" to the remote control 2, the control information "(channel, 2)" from the integrated control device 3 is received by the communication unit 101. The control unit 102 then changes the channel of the television to channel 2, based on the received control information.

As described hereinabove, in the voice operation system 1 for a plurality of devices according to an exemplary embodiment of the present disclosure, when it has not been possible to specify a device name from the recognition result for a voice command spoken by the user, the device specifying unit 34 extracts remote control identification information within remote control operation information that is output from the remote control 2, and specifies the device 10 that is associated with the remote control identification information, as being the device that is the operation target of the user. Thus, a voice operation for which the remote control 2 is used can be carried out for the plurality of devices 10 to 12 on the home network, and also a voice operation in which a device name has been omitted becomes possible with respect to a specific device 10 that is associated with the remote control 2, from among the plurality of devices.

For example, it is assumed that the device 10 is a television, the device 11 is a video recorder, and the device 12 is an air conditioner, and it is assumed that the remote control 2 is a dedicated voice input remote control associated with the television. When the user uses the remote control 2 to voice-operate the video recorder and the air conditioner, it is necessary to speak a voice command that includes the device name, such as "video recorder, record" and "air conditioner, turn on cooling"; however, for the television, an operation in which the "television" device name does not have to be spoken becomes possible, such as "increase volume". It should be noted that, in the present embodiment, a voice operation for the television by means of a voice command that includes the device name is possible, as in "television, increase volume".

Thus, for example, when the usage frequency of a voice operation for the television is high compared to the video recorder and air conditioner, or when a voice operation is carried out only for the television, it is no longer necessary to speak the device name of the television that is the specific device, and therefore the complexity for the user can be reduced, and also quick operation instructions for the television become possible. In other words, in addition to voice operations for a plurality of devices being possible, a quick operation instruction in which speech designating a device name has been omitted is possible for a specific device among the plurality of devices.

Furthermore, for example, even when a user who has been using a voice recognition television by means of an existing voice input remote control has introduced a system in which a video recorder and an air conditioner and the like can be controlled in an integrated manner via a home network, if the user uses the television-dedicated voice input remote control to operate the existing voice recognition television, the television receives a voice command in which the device name has been omitted. Thus, it is possible for the same operation as prior to the introduction of the system to be carried out for the television, and it is possible to reduce erroneous operations such as speaking without including a device name. In other words, it is sufficient as long as the user remembers that he or she should speak a voice command including a device name only for devices other than the television such as the air conditioner and the video recorder for which a voice operation has newly become possible, and it is therefore possible to simply learn the voice operations for the integrated control system.

Embodiment 2

In the present embodiment, a modified example of the voice operation system 1 for a plurality of devices according to embodiment 1 is described.

FIG. 6 is a block diagram of a voice operation system 111 for a plurality of devices according to the present embodiment.

The voice operation system 111 of the present embodiment has substantially the same configuration as the voice operation system 1 of the first embodiment. The difference between the two voice operation systems is that a device operation history storage unit 39 is additionally provided in the integrated control device 3 of the voice operation system 1 of the first embodiment. Therefore, in the voice operation system 111 of the second embodiment, the same reference numbers as in the first embodiment have been used for configurations that are common with the voice operation system 1 of the first embodiment.

Hereinafter, the configuration that is different from the first embodiment is mainly described, and a description regarding the configurations that are common with the first embodiment is omitted.

The device operation history storage unit 39 newly added to the integrated control device of the first embodiment stores the device name of an operation target specified by the device specifying unit 34.

Furthermore, the device specifying unit 34 uses the device names stored in the household device operation command DB 33, a device name obtained from the voice recognition unit 31, identification information of the remote control 2 obtained from the operation information analysis unit 32, and a device name stored in the device operation history storage unit 39, to specify the operation-target device of the user. Based on the device name specified by the device specifying unit 34 and an operation name obtained from the voice recognition unit 31, the operation specifying unit 35 searches the operation names of each device stored in the household device operation command DB 33, and specifies the operation content for the operation-target device. If operation content is specified, the device name is then stored in the device operation history storage unit 39.

Hereinafter, the operation carried out when the user voice-operates the devices 10 to 12 is described with regard to the voice operation system 111 for a plurality of devices configured as described hereinabove, in the second embodiment. It should be noted that, hereinafter, the difference with the first embodiment is mainly described, and overlapping descriptions are omitted. Specifically, the operation of the remote control 2 is the same processing as the processing of S101 to S106 in the flowchart (FIG. 3) of the first embodiment, and a description thereof has therefore been omitted here. Furthermore, the operations of the devices 10 to 12 are also the same processing as in the first embodiment, and a description thereof has therefore been omitted.

Figure 7:
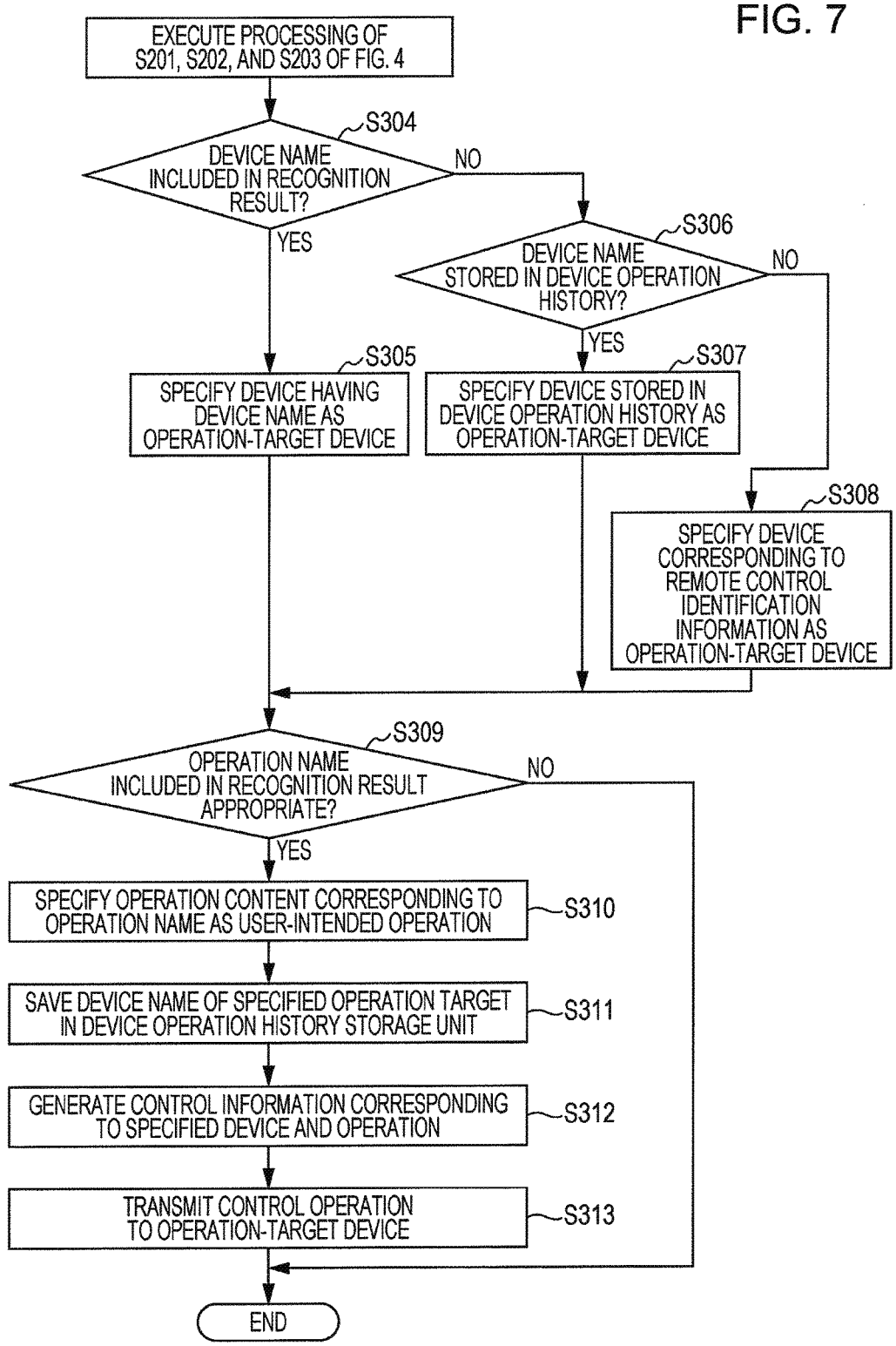
FIG. 7 is a flowchart illustrating the operation of an integrated control device according to exemplary embodiment 2.

FIG. 7 depicts a procedure for the processing of the integrated control device 3 according to the present embodiment. Hereinafter, the operation of the integrated control device 3 is described using FIG. 7. It should be noted that, in the second embodiment, the operations of the reception unit 30, the voice recognition unit 31, the operation information analysis unit 32, the operation specifying unit 35, the control information generation unit 36, and the transmission unit 37 are the same as in the first embodiment. Thus, in FIG. 7, the processing at the beginning is the same as the processing from S201 to S203 of the flowchart (FIG. 4) of the first embodiment, and a description of this processing is therefore omitted. Furthermore, the processing of S312 and S313 is the same as the processing of S209 and S210 of the flowchart (FIG. 4) of the first embodiment, and a description regarding this processing is therefore also omitted. Here, the processing S4 to S11 of the device specifying unit 34 and the operation specifying unit 35 that carry out operations that are different from the first embodiment is described in detail.

The device specifying unit 34 refers to the device names stored in the household device operation command DB 33, and confirms whether or not a device name is included in the recognition result output from the voice recognition unit 31 (S304). If a device name that is stored in the household device operation command DB 33 is included in the recognition result (if "Y" in S304), the device having that device name is specified as the device that is the operation target of the user (S305). Here, reference may be made to a device name management table such as that depicted in FIG. 5A, to specify a device from the device name indicated by the recognition result in the voice recognition unit 31.

On the other hand, if a device name is not included in the recognition result (if "N" in S304), next, it is confirmed whether or not a device name is already stored in the device operation history storage unit 39 (S306). If a device name is already stored in the device operation history storage unit 39 (if "Y" in S306), the device having the device name stored in the device operation history storage unit 39 is specified as the device that is the operation target of the user (S307). Conversely, if a device name is not stored in the device operation history storage unit 39 (if "N" in S306), based on the identification information of the remote control 2 extracted by the processing (S202 of FIG. 4), the device 10, which corresponds to that identification information, is specified as the device that is the operation target of the user (S308).

The operation specifying unit 35 confirms the appropriateness of the operation name obtained by the recognition processing (S203 of FIG. 4) of the voice recognition unit 31 (S307), and if determined as being appropriate, the operation content corresponding to that operation name is specified as the intended operation of the user with respect to the operation-target device (S308).

The processing of the operation specifying unit 35 is carried out with the following procedure.

First, the device name specified by any of the processing of S305, the processing of S307, or the processing of S308 is used to search the household device operation command DB 33 and read out all operation names corresponding to the specified device. Here, the processing of S308 is the same processing as S206 of FIG. 4. Next, it is confirmed whether or not the operation name obtained by the recognition processing (S203 of FIG. 4) of the voice recognition unit 31 matches any of the operation names read out from the household device operation command DB 33, and it there is a match, it is determined that the operation name is appropriate (S309). If it is determined that the operation name is appropriate (if "Y" in S309), the operation content corresponding to that operation name is read out from the household device operation command DB 33, and that operation content is specified as the intended operation of the user with respect to the operation-target device (S310). Thereafter, the device name specified by any of the processing of S305, the processing of S307, or the processing of S308 is stored in the device operation history storage unit 39 (S311).

Conversely, if there is no match, there is no operation corresponding to the specified device, and it is therefore determined that the operation name obtained from the recognition result is not appropriate ("N" processing in S309), and the series of processing corresponding to the voice command spoken by the user is ended.

Hereinafter, the operations of the device specifying unit 34 and the operation specifying unit 35 are described using a specific example. For example, it is assumed that the device 10 is a television, the device 11 is a video recorder, and the household device operation command DB 33 is that depicted in FIG. 2.

When the user has spoken "video recorder, change to channel 2" to the television-dedicated voice input remote control 2, the device name "video recorder" and the operation name "change to channel 2" are obtained as voice recognition results (S203 of FIG. 4). In the device specifying unit 34, since a device name is included in the recognition result, next, it is confirmed whether or not the recognized device name "video recorder" is included in the household device operation command DB 33 (S304). Since been recognized device name "video recorder" is included in the device names stored in the household device operation command DB 33 depicted in FIG. 2, in this case, the device that is the operation target of the user is specified as being the video recorder (S305).

Next, in the operation specifying unit 35, the household device operation command DB 33 is used to confirm whether or not the operation name "change to channel 2" is registered for the device "video recorder" that has already been specified (S309). Since the recognized operation name "change to channel 2" is included in the operation names stored in the household device operation command DB 33 depicted in FIG. 2, in this case, the content of the intended operation of the user is specified as "select channel 2" (S310). The device name "video recorder" specified by the processing of S305 is then stored in the device operation history storage unit 39.

Thereafter, the control information generation unit 36, the transmission unit 37, and the device 11 carry out the same operations as in the first embodiment, and, as result, the channel of the video recorder, which is the device 11, is changed to channel 2.

Next, in continuation, the operation when "record" has been spoken to the remote control 2 is described. At such time, the operation name "record" is obtained, without a device name, as a voice recognition result (S203 of FIG. 4). Since a device name is not included in the recognition result (S304), the device specifying unit 34 confirms whether or not a device name is stored in the device operation history storage unit 39 (S306). Since "video recorder" was stored as a device name in the device operation history storage unit 39 when the immediately preceding user voice command was spoken ("Y" processing in S306), in this case, the device that is the operation target of the user is specified as being the video recorder (S307).

In the operation specifying unit 35, the household device operation command DB 33 is then used to confirm whether or not the operation name "record" is registered for the device "video recorder" that has already been specified (S309). Since the recognized operation name "record" is included in the operation names stored in the household device operation command DB 33 depicted in FIG. 2, in this case, the content of the intended operation of the user is specified as "record" (S310). The device name "video recorder" specified by the processing of S305 is then stored in the device operation history storage unit 39.

Thereafter, the control information generation unit 36, the transmission unit 37, and the device 11 carry out the same operations as in the first embodiment, and, as a result, recording of the program on channel 2 currently being broadcast is started in the video recorder, which is the device 11.

As described hereinabove, in the voice operation system 111 for a plurality of devices according to the exemplary second embodiment of the present disclosure, when a device name that has been specified by the device specifying unit 34 and the operation specifying unit 35 from a voice command spoken by the user is stored in the device operation history storage unit 39, or the device specifying unit 34 has not been able to specify a device name from the recognition result of a voice command spoken by the user, the device corresponding to the device name stored in the device operation history storage unit 39 is specified as being the device that is the operation target of the user. However, when a device name is not stored in the device operation history storage unit 39, as in the first embodiment, remote control identification information from within remote control operation information output from the remote control 2 is extracted, and the device 10 that is associated with the remote control identification information is specified as being the device that is the operation target of the user.

Thus, in the exemplary second embodiment of the present disclosure, as in the first embodiment, a voice operation for which the remote control 2 is used can be carried out for the plurality of devices 10 to 12 on the home network, and also a voice operation in which a device name has been omitted becomes possible with respect to a specific device 10 that is associated with the remote control 2, from among the plurality of devices. In addition, if a voice command that includes a device name is spoken once with respect to the device 11 or the device 12 other than the specific device 10 that is associated with the remote control 2, when the same device is continuously voice-operated, a voice operation in which the device name has been omitted becomes possible. In other words, in addition to a voice operation for a plurality of devices being possible, a quick operation instruction in which speech designating a device name has been omitted is possible for a specific device among the plurality of devices.

For example, it is assumed that the device 10 is a television, the device 11 is a video recorder, and the device 12 is an air conditioner, and it is assumed that the remote control 2 is a dedicated voice input remote control associated with the television. In the first embodiment, when the user uses the remote control 2 to voice-operate the video recorder, it is usually necessary to speak a voice command including a device name, such as "video recorder, change to channel 2" and "video recorder, record"; however, in the present embodiment, if "video recorder, change to channel 2" is spoken, the device name "video recorder" is stored in the device operation history storage unit 39, and therefore, when the same device is continuously operated, operation becomes possible by merely the voice command "record" in which the device name has been omitted.

Thus, it is no longer necessary to speak a device name when the same device is continuously voice-operated even if the device is not the specific device associated with the remote control 2, and therefore the complexity for the user can be further reduced, and quick operation instructions for each device become possible.

It should be noted that the device name stored in the device operation history storage unit 39 according to the second embodiment may be erased if not updated for a fixed time after the device name has been stored. Furthermore, the device name may be erased if voice has not been input to the reception unit 30 for a fixed time.

Embodiment 3

In the present embodiment, a modified example of the voice operation system 1 for a plurality of devices according to embodiment 1 is described.

Figure 8:
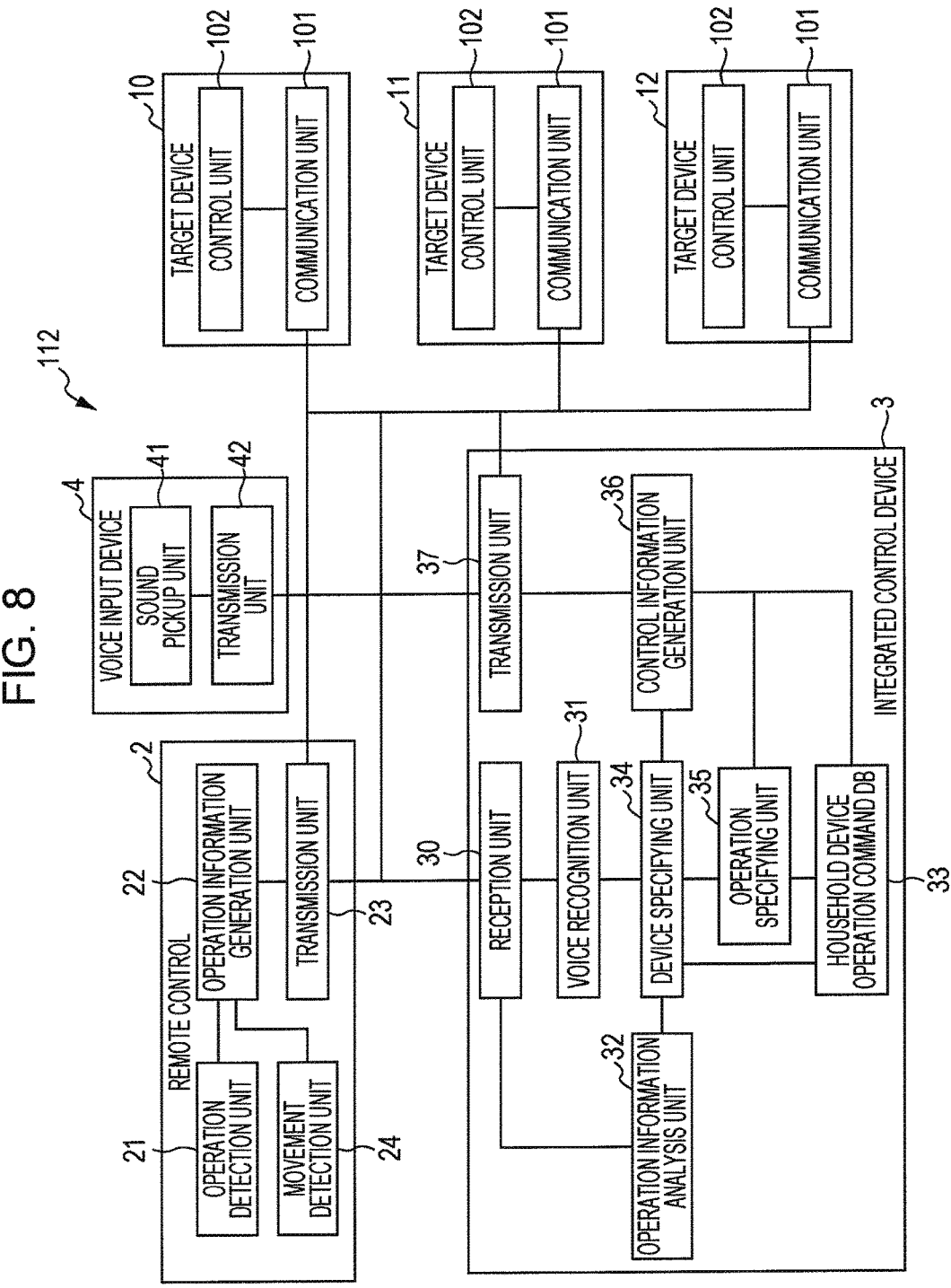
FIG. 8 is a block diagram of a voice operation system for a plurality of devices according to exemplary embodiment 3.

FIG. 8 is a block diagram of a voice operation system 112 for a plurality of devices, according to the present embodiment.

As depicted in FIG. 8, the voice operation system 112 of the present embodiment includes a device 10, a device 11, and a device 12 that are operation targets, a remote control 2, an integrated control device 3 that voice-operates the devices 10 to 12, and a voice input device 4. It should be noted that the devices 10 to 12 and the integrated control device 3 in the present embodiment are substantially the same as the configurations described in relation to the voice operation system 1 of the first embodiment. The differences are the configuration of the remote control 2, and that the voice input device 4 is newly provided. Therefore, in the voice operation system 112 of the third embodiment, the same reference numbers as in the first embodiment have been used for configurations that are common with the voice operation system 1 of the first embodiment.

Hereinafter, the remote control 2 and the voice input device 4, which are configurations that are different from the first embodiment, are mainly described, and a description of the configurations that are common with the first embodiment is omitted.

As in the first embodiment, it is assumed that the remote control 2 is a remote control that is associated with the device 10. Generally, it is assumed that the remote control 2 is a device 10-dedicated remote control that is included when the device 10 is purchased by itself, and identification information indicating that the remote control 2 is associated with the device 10 is assigned to the remote control 2.

As depicted in FIG. 8, the remote control 2 is configured from an operation detection unit 21, an operation information generation unit 22, a transmission unit 23, and a movement detection unit 24. As in the first embodiment, a plurality of operation buttons for executing each function of the device 10 are arranged on the upper surface of the remote control 2. However, in the present embodiment, different from the first embodiment, a sound pickup unit 20 and a voice input start button with which the voice of the user is input are not provided.

The operation detection unit 21 detects user operations with respect to each operation button of the remote control 2, and outputs a signal corresponding to each operation button.

The movement detection unit 24 detects movement with respect to the remote control of the user, and outputs a signal corresponding to the detected movement. Here, a detected movement is a movement with which the user is using the remote control, and, specifically, is a movement with which the user is holding or moving the remote control. In order to detect these movements, the remote control 2, for example, has a touch sensor attached to the external surface of a casing, and is internally equipped with motion sensors such as an acceleration sensor and a gyro sensor inside the casing. Movements with which the user is using the remote control are detected by recognizing signals from the sensors.

The operation information generation unit 22 generates remote control operation information on the basis of the identification information of the remote control 2 and signals received from the operation detection unit 21 and the movement detection unit 24. The transmission unit 23 transmits the remote control operation information obtained from the operation information generation unit 22, to the devices 10 to 12 and the integrated control device 3 by means of a communication method such as infrared, Bluetooth (registered trademark), or a wireless LAN or the like.

The voice input device 4 is configured from a sound pickup unit 41 and a transmission unit 42. The sound pickup unit 41 inputs a user voice, and the transmission unit 42 transmits the voice that has been input by the sound pickup unit 41, to the integrated control device 3 by means of a communication method such as a wired LAN, Bluetooth (registered trademark), or a wireless LAN or the like. It should be noted that the voice input device 4 can be installed anywhere in a household as long as the voice input device 4 is installed within a range in which the sound pickup unit 41 can input a user voice. For example, when the device 10 is voice-operated, the voice input device 4 may be installed on the ceiling or lighting of the room in which the device 10 is installed, or on top of the device 10.

Hereinafter, the operation carried out when the user voice-operates the devices 10 to 12 is described with regard to the voice operation system 112 for a plurality of devices configured as described hereinabove, in the third embodiment. It should be noted that, hereinafter, the differences with the first embodiment are mainly described, and overlapping descriptions are omitted. Specifically, the operation of the integrated control device 3 is the same processing as the processing of S201 to S210 in the flowchart (FIG. 4) of the first embodiment, and a description thereof has therefore been omitted here. Furthermore, the operations of the devices 10 to 12 are also the same processing as in the first embodiment, and a description thereof has therefore been omitted.

Figure 9:
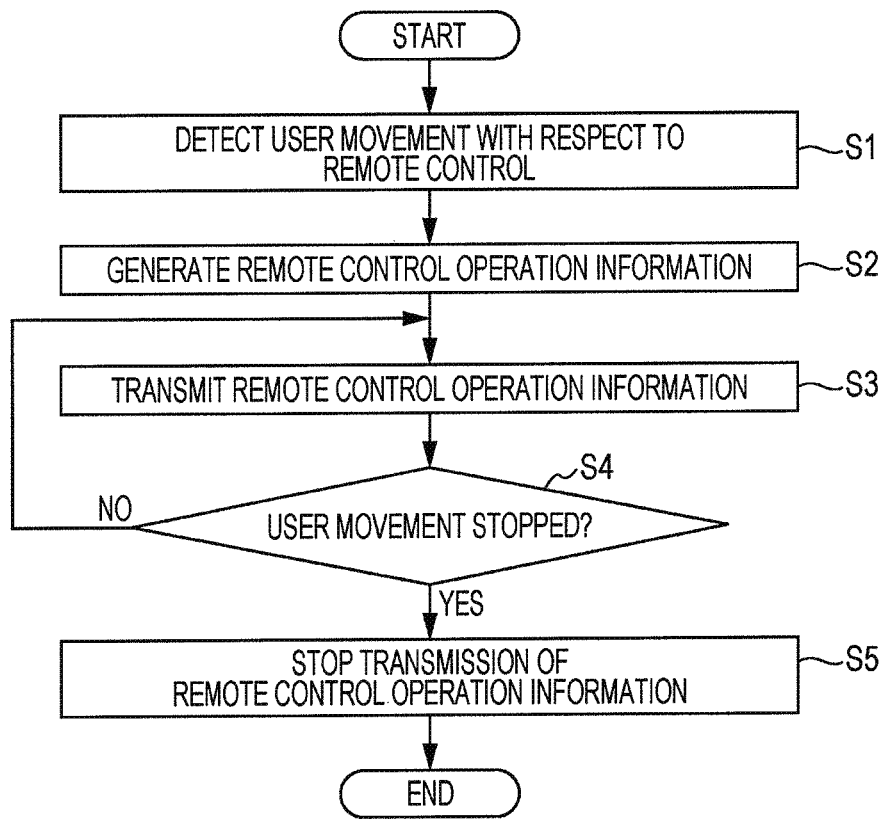
FIG. 9 is a flowchart illustrating the operation of a remote control according to exemplary embodiment 3.

FIG. 9 depicts a procedure for the processing of the remote control 2 in the present embodiment. Hereinafter, the operation of the remote control 2 is described using FIG. 9.

For example, if the user holds and moves the remote control 2, the movement detection unit 24 detects these movements of the user with respect to the remote control 2, and outputs a movement detection signal to the operation information generation unit 22 (S401). When the movement detection signal is received from the movement detection unit 24, the operation information generation unit 22 generates information in which operation information based on the signal obtained from the operation detection unit 21 and identification information indicating the remote control 2 are combined, as remote control operation information (S402). The transmission unit 23 transmits the remote control operation information obtained from the operation information generation unit 22 to the integrated control device 3 and the devices 10 to 12 (S403). The movement detection unit 24 ordinarily checks whether or not the movements of the user with respect to the remote control 2 are continuing (S404), and stops the output of the movement detection signal if it is determined that the movements of the user with respect to the remote control have stopped. At the same time, the transmission unit 23 stops the transmission of the remote control operation information (S405). It should be noted that, with regard to the determination as to whether the movements of the user with respect to the remote control 2 have stopped, it may be determined that the movements of the user with respect to the remote control 2 have stopped if a state in which the output level of a holding sensor or a motion sensor provided in the remote control 2 has become equal to or less than a fixed value continues for a fixed time, for example.

Next, the operation of the voice input device 4 is described. In the voice input device 4, the sound pickup unit 41 ordinarily inputs voice that the user has spoken, and the transmission unit 42 transmits the voice that is picked up, to the integrated control device 3.

As described hereinabove, in the voice operation system for a plurality of devices according to an exemplary embodiment of the present disclosure, as in the first embodiment, when it has not been possible to specify a device name from the recognition result for a voice command spoken by the user, the device specifying unit 34 extracts remote control identification information within remote control operation information that is output from the remote control 2, and specifies the device 10, which is associated with the remote control identification information, as being the device that is the operation target of the user. However, different from the first embodiment, because the sound pickup unit 41 that inputs the voice and the remote control 2 are separate, the identification information of the remote control 2, which is necessary to specify that the operation-target device is the device 10 associated with the remote control 2, is output as a result of the movement detection unit 24 detecting a movement of the user with respect to the remote control 2.

Thus, in the exemplary third embodiment of the present disclosure, as in the first embodiment, a voice operation for which the voice input device 4, which is arranged in a different location from the remote control 2, is used can be carried out for the plurality of devices 10 to 12 on the home network, and also a voice operation in which a device name has been omitted becomes possible with respect to a specific device 10 that is associated with the remote control 2, from among the plurality of devices, as long as the user holds the remote control 2.

Thus, as in the first embodiment, when the usage frequency of a specific device is high among a plurality of devices, or when a voice operation is only carried out for the specific device, it is no longer necessary to speak that device name, and therefore the complexity for the user can be reduced, and quick operation instructions for the specific device become possible.

It should be noted that although the integrated control device 3 has been described in the third embodiment using the integrated control device of the first embodiment, the integrated control device of the second embodiment, namely the integrated control device provided with the device operation history storage unit 39, may be used.

Furthermore, in the third embodiment, the remote control 2 has a configuration provided with the operation detection unit 21 that detects an operation button arranged on the upper surface of the remote control 2; however, the remote control 2 does not need to have this configuration. In this case, the remote control 2 is different from a conventional, general remote control in that when the movement detection unit 24 has detected movements in which the user has held and moved the remote control 2, that information is transmitted to the devices 10 to 12 and the integrated control device 3 as remote control operation information.

It should be noted that although the device 10 associated with the remote control 2 and the integrated control device 3 are configured as separate devices in the aforementioned embodiments, the integrated control device 3 may be configured including the control unit 102 that is a constituent element of the device 10. In this case, in the integrated control device 3, the control unit 102 executes a corresponding operation, based on control information that is output from the control information generation unit 36. Specifically, in the description of the first embodiment, an example is given in which the device 10 is assumed to be a television, the device 11 is assumed to be a video recorder, and the device 12 is assumed to be an air conditioner; however, the integrated control device 3 itself may have the function of a television, a video recorder, or an air conditioner.

Furthermore, in the aforementioned embodiments, the remote control 2 is set as a remote control associated with the device 10; however, the remote control 2 may be associated with any device as long as the device is connected to the home network and the integrated control device 3.

Furthermore, in the aforementioned embodiments, the constituent elements may be configured by using dedicated hardware, or may be realized by executing a software program suitable for the constituent elements. The constituent elements may be realized by a program execution unit such as a CPU or a processor reading out and executing a software program recorded in a recording medium such as a hard disk or a semiconductor memory.

In addition, some or all of the constituent elements that make up the aforementioned apparatuses may be configured from one system LSI (large-scale integration). A system LSI is a multifunctional LSI in which a plurality of components are integrated and manufactured on one chip and, specifically, is a computer system configured including a microprocessor, a ROM, and a RAM and the like. A computer program is stored in the RAM. As a result of the microprocessor operating according to the computer program, the system LSI achieves the function thereof.

And furthermore, some or all of the constituent elements that make up the aforementioned apparatuses may be configured from an IC card or an individual module that is able to be attached to and detached from the apparatuses. The IC card or the module is a computer system configured from a microprocessor, a ROM, and a RAM and the like. The IC card or the module may include the aforementioned multifunctional LSI. As a result of the microprocessor operating according to a computer program, the IC card or the module achieves the function thereof. This IC card or this module may be tamper-resistant.

Furthermore, the methods presented above are given as exemplary aspects of the present disclosure. Furthermore, a computer program that realizes these methods by means of a computer, and a digital signal constituting the computer program are applicable as other aspects of the present disclosure.

In addition, yet another exemplary aspect of the present disclosure also includes an aspect in which the computer program or the digital signal is recorded on a computer-readable recording medium such as a flexible disk, a hard disk, a CD-ROM, an MO, a DVD, a DVD-ROM, a DVD-RAM, a BD (Blu-ray Disc (registered trademark)), a USB memory, a memory card such as an SD card, or a semiconductor memory, for example. Furthermore, an exemplary aspect of the present disclosure may be the digital signal that is recorded on these recording mediums.

Furthermore, an exemplary aspect of the present disclosure includes an aspect in which the computer program or the digital signal is transmitted by way of a network represented by an electric telecommunication line, a wireless or wired telecommunication line, and the Internet, or data broadcasting or the like.

Furthermore, an exemplary aspect of the present disclosure includes a computer system provided with a microprocessor and a memory, in which the memory stores the computer program, and the microprocessor operates according to the computer program.

Furthermore, an exemplary aspect of the present disclosure includes the case where the aforementioned apparatus is realized by another independent computer system, as a result of the program or the digital signal being recorded on the recording medium and transferred, or as a result of the program or the digital signal being transferred by way of the network or the like.

Furthermore, the numbers used hereinabove are all examples for explaining the present disclosure in detail, and the present disclosure is not limited to the numbers given as examples.

Furthermore, the divisions of the function blocks in the block diagrams are examples, and a plurality of function blocks may be realized as one function block and one function block may be divided into a plurality such that some functions are moved to other function blocks. Furthermore, the functions of a plurality of function blocks having similar functions may be processed by individual items of hardware or software in a parallel or time-divided manner.

Furthermore, the order in which the plurality of steps included in the aforementioned device management method are executed is an example for explaining the present disclosure in detail, and may be an order other than the aforementioned. Furthermore, some of the steps may be executed at the same time as (in parallel with) other steps.

Hereinabove, embodiments of a device management apparatus according to one or a plurality of aspects have been described; however, the present disclosure is not limited to these embodiments. Modes in which various modifications conceived by a person skilled in the art have been implemented in the present embodiments, and modes constructed by combining the constituent elements in different embodiments may also be included within the scope of one or more aspects provided they do not depart from the purpose of the present disclosure.

The present disclosure is useful for a device control method in a device management system that is connected to a plurality of target devices arranged in the same household and manages the plurality of target devices.

What is claimed is:

1. A method for managing a plurality of target devices, the plurality of target devices being arranged in a same household, the method comprising:

receiving, by an input associated with a first target device among the plurality of target devices, a voice command that includes first voice information, the voice command indicating an operation instruction for one of the plurality of target devices, the first voice information including identification information that identifies the first target device;

specifying the first target device by referencing a database in which the identification information and a device ID of the first target device are associated;

recognizing the operation instruction from the voice command;

determining whether or not the voice command includes second voice information that identifies a second target device among the plurality of target devices as an operation object for the operation instruction;

when the second voice information is not included in the voice command, causing the first target device to execute the operation instruction; and when the second voice information is included in the voice command, transmitting a control command to the second target device identified as the operation object for causing the second target device to execute the operation instruction.

2. The method according to claim 1, further comprising:
when the voice command includes the second voice information, confirming whether or not the second target device identified by the second voice information is included in the database.

3. The method according to claim 1, wherein
the second voice information is a name that identifies the second target device.

4. The method according to claim 3, wherein
the name is a general name of the second target device.

5. The method according to claim 3, wherein
the name is an arbitrary name associated with the second target device, the arbitrary name being specified by a user.

6. The method according to claim 1, further comprising:
outputting, by the first target device, a voice input start signal in response to an operation by a user.

7. The method according to claim 6, wherein
the operation by the user is detected by the first target device.

8. The method according to claim 1, wherein
at least one of the specifying, the recognizing, and the determining are performed by a processor.

9. A system for managing a plurality of target devices, the plurality of target devices being arranged in a same household, the system comprising:
at least one processor; and
at least one memory including at least one set of instructions that, when executed by the at least one processor, cause the at least one processor to perform operations including:

receiving, by an input associated with a first target device among the plurality of target devices, a voice command that includes first voice information, the voice command indicating an operation instruction for one of the plurality of target devices, the first voice information including identification information that identifies the first target device;

specifying the first target device by referencing a database in which the identification information and a device ID of the first target device are associated;

recognizing the operation instruction from the voice command;

determining whether or not the voice command includes second voice information that identifies a second target device among the plurality of target devices as an operation object for the operation instruction;

when the second voice information is not included in the voice command, causing the first target device to execute the operation instruction; and when the second voice information is included in the voice command, transmitting a control command to the second target device identified as the operation object for causing the second target device to execute the operation instruction.

10. A non-transitory computer-readable including an executable computer program for managing a plurality of target devices that, when executed by at least one processor, causes the processor to perform operations comprising:

receiving, by an input associated with a first target device among the plurality of target devices, a voice command that includes first voice information, the voice command indicating an operation instruction for one of the plurality of target devices, the first voice information including identification information that identifies the first target device;

specifying the first target device by referencing a database in which the identification information and a device ID of the first target device are associated;

recognizing the operation instruction from the voice command;

determining whether or not the voice command includes second voice information that identifies a second target device among the plurality of target devices as an operation object for the operation instruction;

when the second voice information is not included in the voice command, causing the first target device to execute the operation instruction; and when the second voice information is included in the voice command, transmitting a control command to the second target device identified as the operation object for causing the second target device to execute the operation instruction.

* * * * *

Disclaimer

10,102,861 B2 - Yoshihiro Kojima, Hyogo (JP); Yoichi Ikeda, Hyogo (JP). DEVIE CONTROL METHOD, DEVICE MANAGEMENT SYSTEM, AND VOICE INPUT APPARATUS. Patent dated October 16, 2018. Disclaimer filed July 2, 2021, by the assignee, Sovereign Peak Ventures, LLC.

I hereby disclaim the following complete claims 1-10 of said patent.

*(Official Gazette, April 12, 2022)*